United States Patent Office 3,134,695
Patented May 26, 1964

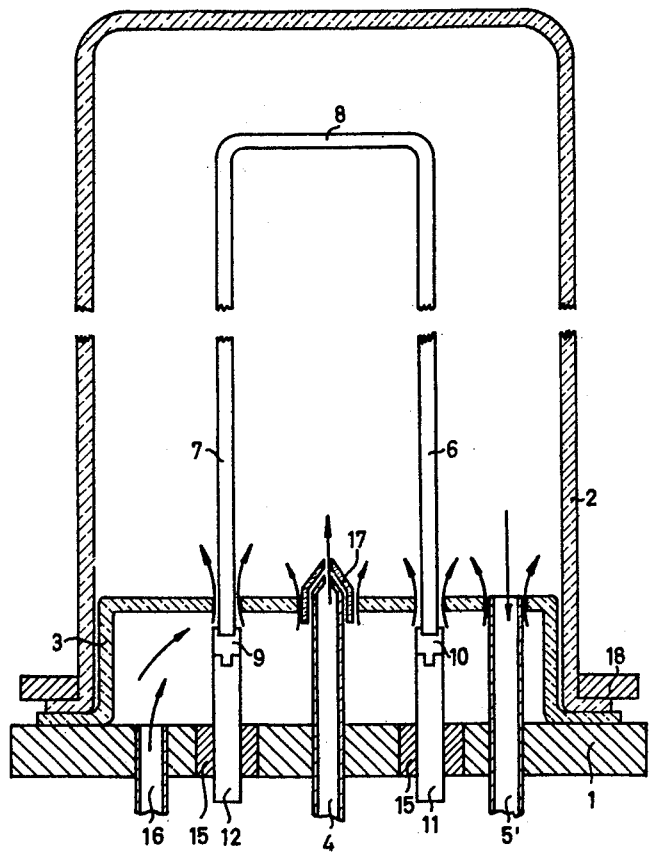
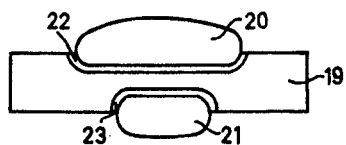

3,134,695
APPARATUS FOR PRODUCING ROD-SHAPED
SEMICONDUCTOR BODIES
Heinz Henker, Josef Grabmaier, Theodor Rummel, and Hans F. Quast, Munich, Germany, assignors to Siemens & Halske Aktiengesellschaft, Berlin, Germany, a corporation of Germany
Filed Dec. 8, 1959, Ser. No. 858,223
Claims priority, application Germany Dec. 9, 1958
9 Claims. (Cl. 118—49.5)

According to a known method for producing hyperpure silicon for electric semiconductor devices, a gaseous silicon compound, preferably highly purified, is thermally decomposed under formation of free silicon, the hyperpure silicon evolving from the gaseous phase being precipitated upon a carrier body heated by electric current passing through the body. At the beginning of the precipitation operation, a long wire or filament-shaped carrier body of highly purified silicon is pre-heated and is subsequently further heated by electric current which directly passes through the carrier, for performing the precipitating operation. The carrier is thereafter kept at the reaction temperature by the electric current flow.

Our invention relates to a further improvement of the above-described method and apparatus and has for its object to further increase the purity of the semiconductor material obtained.

With the known method for precipitating silicon from the gaseous phase, an n-conducting silicon with a specific resistance of 10 to 30 ohm·cm. is obtained. The residual impurities are extremely troublesome with respect to the further fabrication of the silicon bodies. The method and apparatus according to the invention results in a considerable reduction of the impurities built into the silicon. Thus, silicon rods with a specific resistance of 600 to 1000 ohm·cm. are obtained.

According to our invention we perform the thermal decomposition, and the precipitation of the substance to be produced, within a reaction chamber, which contains, essentially, only the carrier, and which is separated from the rest of the reaction vessel by a partition consisting preferably of quartz. This provides an antechamber in which the other components of the processing device are located, particularly the holders and current supply leads for the carrier, as well as the metallic base plate of the reaction vessel. The hood of the reaction vessel and the partition, that is all surfaces that border the reaction space proper, consist preferably of pure quartz. Those components of the apparatus that consist of materials from which substances, particularly phosphorus, will evaporate at the temperatures used for the method and which may result in contamination of the semiconductor material, are thus separated by a wall from the reaction space proper. The waste gas resulting from the method passes, according to another feature of our invention at first through relatively small openings into the antechamber that contains substantially all components with the exception of the carrier. From the antechamber the waste gas passes through a drain pipe, preferably passing through the metallic base plate of the reaction vessel. The partition is provided with narrowest possible bores, through which the semiconductor rods enter into the reaction chamber proper. In one form of the invention, the gaps remaining between the rod and the bores serve for passing the waste gas from the reaction chamber into the antechamber, and these narrow gaps prevent to a great extent the diffusion of impurities from the metal parts of the antechamber into the reaction space proper. The supply pipe for the reaction gas mixture passes through the base plate of the reaction vessel and protrudes preferably through the middle of the partition into the reaction chamber proper.

It is also preferable to avoid passing the rod or rods through the wall of the reaction vessel located opposite the base plate, because this would require providing in the reaction chamber another partition, in order to prevent as far as possible any impurities from passing through the above-mentioned passages into the reaction space. For that reason, we employ a U-shaped part having two limbs formed by the initial carrier rods and by a bridging member consisting of the same, likewise highly purified semiconductor substance. During precipitation, the U-shaped part has free ends of its respective limbs connected to a source of operating voltage, and is kept at the decomposition temperature by the current passing from the voltage source through the U-shaped part. The normal line voltage of 110 or 220 volts is not sufficient to heat the carrier bodies from normal room temperature (20° C.) up to the decomposition temperature, due to the high degree of purity of the carrier bodies. For that reason, the free ends of the two U-limbs are connected to a high-voltage source at the beginning of the method. With increasing heating, the conductance of the semiconductor material, particularly of silicon, increases so that the current supply can be switched over from the high-voltage source to the source of normal line voltage. The current is preferably regulated by means of an inductive resistance free of power losses. However, the preheating of the rod may also be effected from the outside by means of a furnace or a separate electric heater.

It is advantageous to interconnect the two rod-shaped limbs within the reaction chamber by a bridge consisting of the semiconductor material. It is also possible, in this manner, to mount more than two carriers within the same reaction chamber, and to connect them with one another by a bridge.

Also applicable as a connecting bridge for the rod-shaped carriers is a rod of graphite, or other carbon material. However, the purity of the precipitated semiconductor material is then limited because the graphite, or carbon rod, made in accordance with conventional methods, contain a binding agent which evaporates out of the carbon material at temperatures of approximately 1100° C. and may result in occlusions or impurities in the semiconductor material. Furthermore, carbon has the property of absorbing gas in the atmosphere which in the subsequent glowing process may also cause impurities in the semiconductor material. In order to minimize the danger of foreign inclusions within the semiconductor material, it is therefore favorable to make the bridge of the same semiconductor substance as the two limbs. When using a bridge consisting of the same hyper-pure semiconductor material as the limbs or rods, the thermal decomposition of the high pure gaseous compound of the semiconductor material, and the precipitation of the substance to be gained upon the U-shaped carrier, whose cross section is increased accordingly, results in a semiconductor material of an extremely high degree of purity.

The limbs and the bridge may consist of a single, integral piece of the semiconductor material. A method has already been proposed for producing such a semiconductor part, according to which the silicon is precipitated from a highly purified gaseous silicon compound onto a heated carrier body of hyper-pure silicon, the carrier consisting of a thin wire-shaped body which is thickened by the precipitating silicon. Used is a helical silicon wire which is thickened by the precipitating silicon into a wound (helical) silicon rod. A portion of this rod, which can be stretched as desired by employing a zone of high temperature traveling through the entire rod, can be used particularly as a U-shaped carrier.

The invention will be further explained with reference to the drawing in which:

FIG. 3 is a sectional view of another embodiment of apparatus according to the invention; and FIG. 4 illustrates, schematically, a cross section of a transistor with a silicon body, as obtained by the method and apparatus according to the invention.

Figure 1:
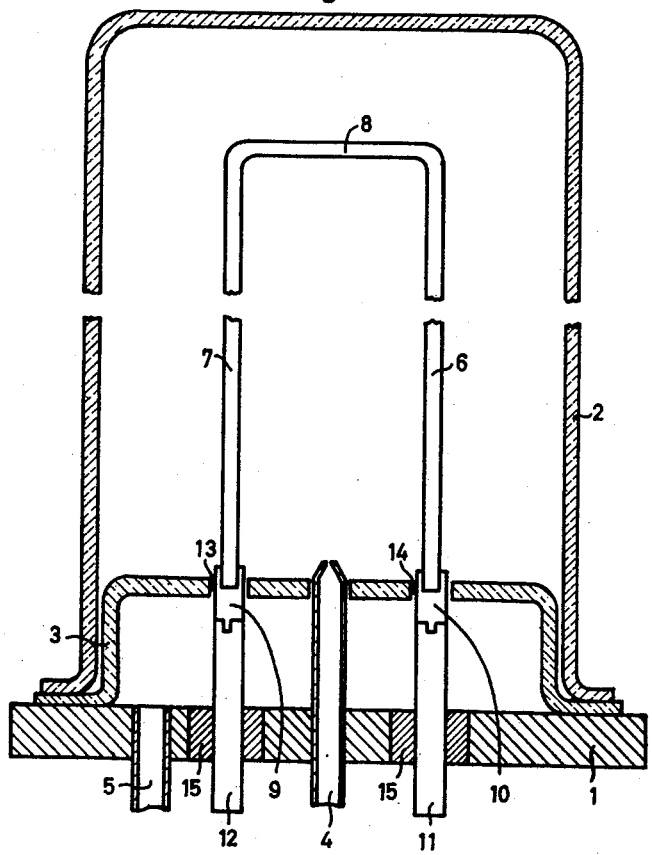
FIG. 1 is a sectional view of an apparatus for performing the method according to the invention.

The reaction vessel of the apparatus shown in FIG. 1 comprises a quartz bell 2 and a base plate 1 of metal which is cooled during operation for example by means of water. The quartz bell 2, and a partition 3 also consisting of quartz, are vacuum-tightly joined with the base plate 1. The partition 3 preferably also consists of a quartz disc placed upon or about the holders for the semiconducting carrier or upon the carrier itself. In this embodiment the waste gases can pass downwardly from the upper reaction chamber through the gaps remaining between the quartz bell 2 and the partition 3, and into the lower antechamber formed between the partition 3 and the base plate 1.

Figure 2:
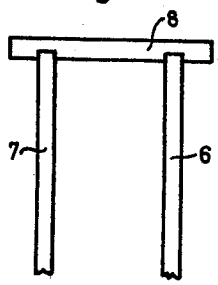
FIG. 2 shows a modified detail of the same apparatus.

In FIG. 1 substantially only the U-shaped carrier body of the silicon protrudes from the antechamber into the reaction chamber proper. The limited protrusion of holders 9 and 10 is discussed below. The carrier body is formed of two limbs 6, 7 and a bridge 8. As mentioned above, the carrier may consist of a single piece of silicon or, as shown in FIG. 2, a bridge 8 may be placed upon the limbs, which for this purpose are slotted at the top.

The two limbs 6 and 7 of the U-shaped carrier pass through bores 13, 14 of the partition 3. These bores are as narrow as feasible. A nozzle 4, for supplying the reaction gas mixture, passes through the antechamber and the partition 3 into the reaction space. The reaction gas mixture consists of a gaseous silicon compound, for example silicon chloroform, and a carrier gas, for example hydrogen. Mounted in the antechamber are the current supply terminals 11 and 12 for the respective limbs 6 and 7, and also the limb holders 9 and 10 which are made of carbon or low-ohmic silicon, or carbon coated with silicon. The current supply terminals are preferably of copper, and are vacuum-tightly sealed in the base plate 1 by means of insulating bushings 15. A discharge pipe 5 for the waste gases also passes through the base plate 1. The waste gases flow from the upper reaction chamber through the inevitable gaps around the holders 9, 10 into the lower antechamber, from which they escape through the pipe 5.

It is essential to keep the ends of the carrier at a relatively low temperature during the precipitation, that is at a surface temperature at which virtually no precipitation occurs. Thereby the ends are not thickened, or only very slightly thickened, during precipitation, whereas the major portion of the carrier, located between these ends, is kept at a high temperature suitable for decomposition, and precipitation substantially uniformly along the carrier. A portion of the heat produced by the current flowing through the carrier is dissipated at the rod ends through the holders 9, 10. If this heat dissipation is not sufficient, it is advantageous to have the holders 9 and 10 protrude somewhat into the reaction chamber, as shown in FIG. 1, in order to prevent the openings at 13 and 14, of the quartz partition 3, from becoming closed by the growing precipitation of silicon. However, the free ends of the carrier may also protrude into the antechamber if, during the operation of the device, a flow of gas, for example argon or preferably hydrogen, is passed along the ends of the carrier. This flow of gas acts as a coolant and also envelops the carrier ends, particularly in the bores of the quartz partition 3, thus preventing the gaseous semiconductor compound from reaching these localities of the carrier. This will be further explained in connection with the embodiment shown in FIG. 3.

Another method and apparatus, according to the invention, for producing hyper-pure semiconductor material, particularly silicon, will be described with reference to FIG. 3. According to this method, all structural components situated in the antechamber are continuously scavenged by a flow of gas which passes through the antechamber into the reaction chamber, containing essentially only the carrier designated 6, 7, 8. The gas, preferably hydrogen, is directly passed into the antechamber through a pipe 16 passing through the base plate 1. This gas does not contain an admixture of the semiconductor compound to be decomposed, for example $SiCl_4$ or $SiHCl_3$. The reaction waste gases pass through a discharge pipe 5' directly from the reaction chamber, containing essentially only the carrier; that is, these waste gases do not pass into the antechamber. Since the hydrogen gas envelops all structural components that protrude through the partition 3 into the reaction chamber, no waste gases can reach the interior of the antechamber, the gas contents of which come exclusively from the hydrogen intake pipe 16.

A major advantage of the gas or hydrogen "apron" enveloping all protruding parts is the fact that the thin carrier rods may extend into the interior of the antechamber, and yet are not thickened at the localities where they pass through the partition 3, since the hydrogen apron prevents the precipitation of semiconductor material at the carrier ends. And further, the chlorinated hydrocarbon freed in the decomposition is prevented from entering together with the waste gases into the antechamber and from attacking the metal parts located in the antechamber, which attack may liberate undesired doping substances. All parts contained in the antechamber, particularly the electrode connections, namely the holders and current supply terminals, and all gas inlets and gas outlets, are surrounded by the hydrogen apron, so that the evaporation of impurities out of the metal parts is prevented.

The pressure ring 18 serves to secure a tight and reliable connection between the individual components of the reaction vessel. It is preferable in some cases to cover the top of the gas supply pipe 4, where it protrudes into the reaction chamber, with a quartz cap 17, or to make the entire pipe of quartz. These protective measures may be used relative to all other gas pipes that protrude into the reaction chamber.

Semiconductor rods, particularly those of silicon, produced in accordance with the invention are especially well suited for further fabrication into the transistors and asymmetrical conductors, due to their extremely high degree of purity, stressed above. Shown in FIG. 4 is an example of a transistor whose n-type or p-type zone 19 is produced by slicing a silicon crystal rod produced in accordance with the invention, whereas the zone of the respective opposite type of conductance is produced by alloying of doping substances acting as acceptor or donor, such as indium, or a gold-antimony alloy. By alloying the alloy pellets 20 (collector electrode) and 21 (emitter electrode) into the silicon body 19, the originally n-type or p-type silicon forms respective recrystallization zones 22 and 23 of the opposite conductance type to form a p-n junction.

When the silicon rods produced according to the invention are further processed by zone melting, the resulting silicon rods contain essentially only boron as impurity so that these rods have p-type conductance.

We claim:

1. An apparatus for producing semiconductor material of high purity for electrical purposes, comprising a closed vessel, a partition in said vessel dividing it into a reaction chamber and an antechamber, gas inlet conduit means passing through said partition, the gas inlet conduit means being adapted for supplying a gaseous compound of said semiconductor material which precipitates semiconductor material by decomposition upon heating, electrically conductive means comprising electrically conductive and mutually insulated holding means extending in said antechamber, for connection to an electric current source, the holding means comprising holders, at most only a part of the holders extending into the reaction chamber, the electrically conductive means including a plurality of elongated carrier limbs consisting of the same semiconductor substance as that to be precipitated, each of the said limbs having only one of its ends mounted on one of said respective holders, the other ends of the limbs extending in the interior of the reaction chamber and being conductively connected solely to each other to form a free self-supported interior carrier structure, a gas outlet for said vessel, for exit of reduced waste gas from said antechamber, the partition having bores, the electrically conductive means passing through the bores, there being narrow openings about said electrically conductive means, in said bores, for flow of reacted waste gas from said reaction chamber into the antechamber.

2. The apparatus defined in claim 1, part of the holders extending into the reaction chamber.

3. The apparatus defined in claim 1 for producing silicon semiconductor material, the wall surfaces of the reaction chamber including said partition being made of quartz, the interior carrier structure being made of silicon.

4. An apparatus for producing semiconductor material of high purity for electrical purposes, comprising a closed vessel, a partition in said vessel dividing it into a reaction chamber and an antechamber, gas inlet conduit means passing through said partition and opening into the reaction chamber, the gas inlet conduit means being adapted for supplying thereto a gaseous compound of said semiconductor material which precipitates semiconductor material by decomposition upon heating, electrically conductive means comprising electrically conductive and mutually insulated holding means extending in said antechamber, the holding means comprising holders, at most only a part of the holders extending into the reaction chamber, the electrically conductive means including a plurality of elongated carrier limbs consisting of the same semiconductor substance as that to be precipitated, each of the said limbs having only one of its ends mounted on one of said respective holders, the other ends of the limbs extending in the interior of the reaction chamber and being conductively connected solely to each other to form a free self-supported interior carrier structure, a gas outlet conduit for exit of reacted waste gas from said reaction chamber to the outside, the partition having bores, the electrically conductive means passing through bores, the electrically conductive means passing through the bores, there being narrow openings about said electrically conductive means, in said bores, a second gas inlet means, for supplying a gas which does not precipitate said semiconductor, the second inlet means opening into the antechamber, the latter gas flowing through said narrow openings into said reaction chamber.

5. An apparatus for producing semiconductor material of high purity for electrical purposes, comprising a closed vessel, a partition in said vessel dividing it into a reaction chamber and an antechamber, gas inlet conduit means passing through said partition and opening into the reaction chamber, the gas inlet conduit means being adapted for supplying thereto a gaseous compound of said semiconductor material which precipitates semiconductor material by decomposition upon heating, electrically conductive means comprising electrically conductive and mutually insulated holding means extending in said antechamber, the holding means comprising holders, the electrically conductive means including a plurality of elongated carrier limbs consisting of the same semiconductor substance as that to be precipitated, each of the said limbs having only one of its ends mounted on one of said respective holders, the other ends of the limbs extending in the interior of the reaction chamber and being conductively connected solely to each other to form a free self-supported interior carrier structure, a gas outlet conduit for exit of reacted waste gas from said reaction chamber to the outside, the partition having bores, the electrically conductive means passing through the bores, there being narrow openings about said electrically conductive means, in said bores, a second gas inlet means, for supplying a gas which does not precipitate said semiconductor, the second inlet means opening into the antechamber, the latter gas flowing through said narrow openings into said reaction chamber, the mounted ends of the limbs extending into the antechamber, the holding means being outside of the reaction chamber.

6. An apparatus for producing silicon semiconductor material of high purity for electrical purposes, comprising a closed vessel, a partition in said vessel dividing it into a reaction chamber and an antechamber, gas inlet conduit means passing through said partition and opening into the reaction chamber, the gas inlet conduit means being adapted for supplying thereto a gaseous compound of said semiconductor material which precipitates semiconductor material by decomposition upon heating, electrically conductive means comprising electrically conductive and mutually insulated holding means extending in said antechamber, the holding means comprising holders, the electrically conductive means including a plurality of elongated carrier limbs consisting of the silicon semiconductor material, each of the said limbs having only one of its ends mounted on one of said respective holders, the other ends of the limbs extending in the interior of the reaction chamber and being conductively connected solely to each other to form a free self-supported interior carrier structure, a gas outlet conduit for exit of reacted waste gas from said reaction chamber to the outside, the partition having bores, the electrically conductive means passing through the bores, there being narrow openings about said electrically conductive means, in said bores, a second gas inlet means, for supplying a gas which does not precipitate said semiconductor, the second inlet means opening into the antechamber, the latter gas flowing through said narrow openings into said reaction chamber, the mounted ends of the limbs extending into the antechamber, the holding means being outside of the reaction chamber, the wall surfaces being made of quartz.

7. An apparatus for producing semiconductor material of high purity for electrical purposes, comprising a closed vessel, a partition in said vessel dividing it into a reaction chamber and an antechamber, gas inlet conduit means for passing gas through said partition into the reaction chamber, the gas inlet conduit means being adapted for supplying a gaseous compound of said semiconductor material which precipitates semiconductor material by decomposition upon heating, electrically conductive means comprising electrically conductive and mutually insulated holding means extending in said antechamber, for connection to an electric current source, the holding means comprising a holder, at most only a part of the holder extending into the reaction chamber, the electrically conductive means including a carrier rod consisting of the same semiconductor substance as that to be precipitated, the rod having one of its ends carried by the holder, the other end portion of the rod extending into the interior of the reaction chamber, electric conductor means having conductive connection with the interior end portion for passage of a current in the rod, a gas outlet for said vessel, for exit of gas from said reaction chamber, the partition having an opening, the electrically conductive means passing through the opening, there being a narrow opening about said electrically conductive means, in said partition opening, for flow of an envelope of gas therein, between the two chambers and about the mounted end portion of the rod.

8. An apparatus for producing semiconductor material of high purity for electrical purposes, comprising a closed vessel, a partition in said vessel dividing it into a reaction chamber and an antechamber, gas inlet conduit means for passing gas through said partition into the reaction chamber, the gas inlet conduit means being adapted for supplying a gaseous compound of said semiconductor material which precipitates semiconductor material by decomposition upon heating, electrically conductive means comprising electrically conductive and mutually insulated holding means extending in said antechamber, for connection to an electric current source, the holding means comprising a holder, at most only a part of the holder extending into the reaction chamber, the electrically conductive means including a carrier rod consisting of the same semiconductor substance as that to be precipitated, the rod having one of its ends carried by the holder, the other end portion of the rod extending into the interior of the reaction chamber, electric conductor means having conductive connection with the interior end portion of the rod for passage of a current in the rod, a gas outlet for said vessel, for exit of gas from said reaction chamber, the partition having an opening, the electrically conductive means passing through the opening, there being a narrow opening about said electrically conductive means, in said partition opening, for flow of an envelope of reacted waste gas from the reaction chamber about the mounted end portion and into the antechamber, and a gas outlet for exit of reacted waste gas from said antechamber.

9. An apparatus for producing semiconductor material of high purity for electrical purposes, comprising a closed vessel, a partition in said vessel dividing it into a reaction chamber and an antechamber, gas inlet conduit means for passing gas through said partition into the reaction chamber, the gas inlet conduit means being adapted for supplying a gaseous compound of said semiconductor material which precipitates semiconductor material by decomposition upon heating, electrically conductive means comprising electrically conductive and mutually insulated holding means extending in said antechamber, for connection to an electric current source, the holding means comprising a holder, at most only a part of the holder extending into the reaction chamber, the electrically conductive means including a carrier rod consisting of the same semiconductor substance as that to be precipitated, the rod having one of its ends carried by the holder, the other end portion of the rod extending into the interior of the reaction chamber, electric conductor means having conductive connection with the interior end portion of the rod for passage of a current in the rod, a gas outlet for said vessel, for exit of gas from said reaction chamber, the partition having an opening, the electrically conductive means passing through the opening, there being a narrow opening about said electrically conductive means, in said partition opening, for flow of an envelope of protective gas, which does not precipitate semiconductor material, the flow being about the mounted end portion of the rod and flowing from the antechamber into the reaction chamber, and an inlet for said protective gas into the antechamber.

References Cited in the file of this patent

UNITED STATES PATENTS

| | | |
|---|---|---|
| 2,801,607 | Vodars et al. | Aug. 6, 1957 |
| 2,845,894 | McIlvaine | Aug. 5, 1958 |
| 2,883,269 | Krchma et al. | Apr. 21, 1959 |
| 2,890,139 | Shockley | June 9, 1959 |
| 2,927,004 | Girardot | Mar. 1, 1960 |
| 2,955,466 | Campbell et al. | Oct. 11, 1960 |
| 2,981,605 | Rummel | Apr. 25, 1961 |

FOREIGN PATENTS

| | | |
|---|---|---|
| 1,066,564 | Germany | Oct. 8, 1959 |
| 1,082,239 | Germany | May 25, 1960 |